Patented Aug. 1, 1944

2,355,032

UNITED STATES PATENT OFFICE 2,355,032

ICE CREAM COMPOSITION

Sidney Musher, New York, N. Y., assignor to Musher Foundation Incorporated, New York, N. Y., a corporation of New York No Drawing. Application May 4, 1944,
Serial No. 534,165

10 Claims. (Cl. 99—136)

The present invention relates to an ice cream composition and particularly relates to a stabilized ice cream composition having a relatively high viscosity when in liquid or melted condition as well as possessing good body and texture and being resistant to formation of ice or lactose crystals when held at freezing temperature such as in dealers' ice cream cabinets.

In producing ice cream of desirable body and texture it has been customary to utilize various ingredients or combinations thereof such as gelatin, sodium alginate, algin, Irish moss and psyllium seed and, to a lesser extent, products of the nature of gum tragacanth and India gum. Furthermore, in producing sherbets and ices, it has been customary to utilize pectin and agar as well as the above.

These materials are not only quite expensive but in some cases are even objectionable for addition to ice cream because of Federal and State regulations and the amount which must be added is limited by such regulations.

Furthermore, it is difficult to obtain in an ice cream a combination of characteristics necessary for the production of the highest grade ice cream, such as proper viscosity, as well as resistance to formation of ice and lactose crystals upon holding in dealers' cabinets, good body and texture, proper "chewing" qualities and proper over-run and air incorporation within the time limits normally set for freezing. This problem is a special one in the ice cream industry as viscosity alone or gum action alone which might be sufficient for an ordinary food product is not sufficient for ice cream as ice cream presents special and peculiar problems limited to the ice cream industry.

For example, sodium alginate is being widely used as a stabilizer in the manufacture of ice cream, but has the decided disadvantage of producing in the freshly made mix a viscosity that is much too high and consequently when the ice cream mix is passed over the cooler following pasteurization and homogenization there is danger of physical thickening of the mix on the cooling coils and in the storage tank.

On the other hand, other stabilizers may have a desirable viscosity but do not have the proper action in retarding ice and lactose crystal formation so that it is difficult to obtain from a gum or stabilizer ingredient a composite of the desirable characteristics which are needed to produce an ice cream having a high score, body and texture.

An object of the present invention is therefore to provide a stabilizer and ingredient for ice cream which will supply at low cost to an ice cream good body, texture and viscosity, resistance to ice and lactose crystal formation, as well as other desirable physical characteristics.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

It has now been found that when a certain fraction of oats has been properly separated from the oat grain and desirably finely divided it may be incorporated as an ingredient and stabilizer in an ice cream mix to give such ice cream a high score, providing excellent body, texture and viscosity and being effectve in reducing ice and lactose crystal formation so that the ice cream will stand up for a long period of time in the dealers' cabinets and in the manufacturing plant.

These stabilizing properties are not to be found in the oat grain as a whole or in ordinary oat products as, for example, in oat flour made by grinding oat groats or in pulverized oats or oat hulls. These properties are only developed when a special fraction of the oat grain is removed from the balance of the oat grain.

This special oat fraction is a relatively low starch, relatively high protein fraction which may be obtained after removal of the cellulosic hulls of the oats and after removal of a large portion of the relatively high starch fraction.

This particular fraction of oats is best prepared by first milling the oats to remove the cellulosic hulls leaving the oat groats. These oat groats are then treated to remove the relatively high starch fraction and to concentrate the relatively high protein fraction thereof, obtaining a fraction which contains in excess of about 20% protein and most desirably in excess of 22% protein.

In treating these oat groats to obtain the special stabilizer desired the groats are ground to such an extent that at least 50% and desirably 80% to 90% will pass through a screen or mesh or bolting cloth having a fineness in excess of about 60 mesh and desirably having a fineness in excess of 70 mesh.

The oat groats are ground as indicated above and the ground groats are then separated as by aspirating or screening into two fractions, namely, a coarse fraction and a fine fraction, the coarse fraction comprising the minor fraction of less than 50% by weight and desirably comprising 10% to 20% of the total weight of the ground oat groats and the fine fraction comprising over 50% and desirably between 80% and 90% of the total weight of the ground oat groats.

It is the coarse residue which is left after such grinding and screening or bolting or after aspirating and which has then been finely divided which is found to contain the properties most desirable for incorporation in ice cream as the stabilizer and the gum and stabilizing effect is most particularly observed after the coarse fraction has all been ground to a fineness of at least 50 mesh and most desirably to at least 60 mesh.

This effect is not evident or evidenced when the whole oats are ground and utilized as such or when the oat flour made by grinding oat groats is utilized as such because of the fact that other constituents therein greatly lessen, diminish or render ineffective the unusual stabilizing or gummy properties of the ground, relatively high protein and relatively low starch containing dehulled oat fraction of the present invention.

In the preferred procedure the oat groats, after removal of the hulls by milling processes, are pulverized or ground and then by aspirating, bolting or screening the relatively high starch containing oat fraction is removed. The pulverized oat groats may, for example, be aspirated to separate the minor fraction of the relatively low starch and relatively high protein containing materials. This process may where desired be continued by regrinding, rescreening or reaspirating until the relatively high starch material has been largely removed leaving the relatively high protein fraction behind desirably to be ground to at least 60 mesh for use in accordance with the procedures of the present invention.

The coarse fraction obtained will generally have a protein content in excess of 20% and more desirably in excess of 22%. At the same time the starch content of the coarse fraction will be reduced to much less than the starch content of the fine fraction. For example, the starch content of the coarse fraction will be about 5% to 10% or more less than the starch content of the fine fraction.

The fraction which is relatively high in starch and relatively low in protein and which is left after the production of this ice cream stabilizer will contain about 14% to 16% protein or less.

According to one preferred method of separating the relatively high starchy fraction which is necessary to obtain the gelatinous properties in most highly developed condition, the groats are ground or pulverized so that a major proportion thereof, say at least 50% to 80%, will have a fineness in excess of about 60 mesh and desirably at least 60% to 70% of the ground material will have a sufficient finess to go through about a 90 mesh screen.

Then the pulverized material is screened, preferably by aspirating or placing through a fine silk screen to remove all particles which will not go through about a 60 mesh screen.

A most highly desirable method is to grind the oat groats until over 75%, such as between 75% and 95% and desirably between 80% and 90% will go through a 70 mesh screen but wherein the balance of between 5% and 25% and desirably between 10% and 20% remains on the screen. Then the ground groats are aspirated or screened to remove all the coarse particles and to separate the fine fraction comprising 75% to 95% and desirably 80% to 90% from the coarse fraction comprising the balance of 5% to 25% and desirably 10% to 20% which coarse fraction is used in accordance with the procedures of the present invention.

The oat material which goes through the screen or the fine material which is aspirated will contain the relatively high starch fraction whereas the material left behind on the screen or the coarse fraction thereof will be relatively low in starch content.

This coarse, relatively low starch and relatively high protein material is then finely divided and may then be used in accordance with the procedures of the present invention, the unusual stabilizing properties now being present with the removal of the cellulosic hulls and the relatively high starch fraction of the oat groats and being particularly adaptable for use as a stabilizer for ice cream.

These coarser particles in which the stabilizing properties are concentrated are most desirably ground or pulverized such as in a hammer or stone mill to a particle size of at least 50 mesh and more desirably so that all of the coarse particles will go through at least a 60 mesh screen. This may be accomplished by first grinding the coarse particles and separating that fraction which will go through a 60 or more mesh screen followed by regrinding the remaining coarse portion and continuing the grinding and separating until all of the coarse fraction has been ground to a point where the entire coarse fraction will go through at least a 60 mesh screen.

This material although very different in composition, qualities and chemical structure from gelatin, sodium alginate, algin, Irish moss and psyllium seed, when added to an ice cream mix results in giving the mix the most desirable qualities of the combination of these other materials.

Moreover, the stabilizing action given by this particular fraction of oats is given by neither the oat flour produced by grinding oat groats nor by starch.

Moreover, the product produced in accordance with the present invention has not been found replaceable by any other fraction of oats, or by any other type of cereal or its fractions, including wheat or its fractions, corn or its fractions, barley or its fractions, rye or its fractions, rice or its fractions, or other types of cereals which the applicant has carefully studied.

Furthermore, where oat flour which is made by grinding oat groats is dispersed in an unfrozen ice cream mix, it has the tendency to "ball" or to form agglomerated particles which makes it difficult to add to a liquid ice cream mix because the oat flour frequently becomes coated on the homogenizer screen. However, this particular fraction of oats described in the present invention has the distinct advantage of being more readily dispersable in the ice cream mix.

Although the chemical composition of the finely divided coarse fraction may vary it has been found that 20% protein should be present and most desirably 22% protein. Highly desirable materials have been made containing 25% to 29% protein.

It has been found possible, where desired, to bleach this special oat fraction with chlorine or hypochlorite to lighten its color. It is also possible to obtain this bleaching effect with reducing agents such as sulfites but these reducing agents are not as effective as the oxidizing bleaching agents.

By the term "dry milled oat product" as used in the present application and claims is meant an oat product which has been subjected to either grinding, screening, bolting, aspirating or combinations thereof or even to oil solvent extraction but wherein the oat product has been processed in the substantial absence of water.

The finely divided special oat fraction of the present invention and which desirably has been finely divided to at least about 60 mesh is used as a stabilizer and ingredient for ice cream, being added to the ice cream mix desirably before pasteurizing and homogenizing. The addition is preferably made while the mix is still cool and at a temperature of not exceeding 100° F.

For example, all of the ice cream ingredients are first added to the pasteurizer and then while the mix is still cool and before pasteurizing, the finely divided special oat fraction is added. Desirably the finely divided special oat fraction may be mixed with about 4 parts of its weight of a dry sugar followed by adding the combination to the ice cream mix. The pasteurization temperature to which the ice cream mix containing the finely divided special oat fraction is subjected may be between about 145° F. and 165° F. to 170° F. for about 30 minutes and preferably the higher temperature ranges of 160° F. to 170° F. for about 30 minutes are employed.

The finely divided special oat fraction is thoroughly distributed throughout the body of the ice cream mix in order to obtain a thorough dispersal of the finely divided special oat fraction in the mix and so as to prevent any particles of the finely divided special oat fraction from being deposited upon the homogenizer screen. The ice cream mix containing the finely divided special oat fraction is then homogenized such as at about 1500 to 2500 pounds pressure following which the ice cream mix is cooled and frozen in either the usual type of continuous or batch freezer, the freezing being accompanied by agitation so as to incorporate sufficient air to produce about 80% to 110% of over-run.

The finely divided special oat fraction is added to the ice cream mix in a small amount of less than 2% and preferably less than 1% and desirably between 0.35% and 0.75% against the weight of the ice cream mix. The preferred amount to use is 0.5% by weight against the total weight of the mix, that is against the total weight of all the ice cream ingredients such as the milk, sugar, flavoring and other materials used. For example, between 3½ pounds and 7½ pounds and preferably 5 pounds of the finely divided special oat fraction is added to each 1000 pounds of ice cream mix.

Among the ingredients that may be used in the ice cream mix are included the usual dairy products such as cream, milk, butter, butterfat, condensed milk, condensed skim milk, skim milk powder, whole milk powder, etc. and also water, sugars such as sucrose, dextrose, corn syrup, honey, etc., flavoring materials such as vanilla, chocolate, cocoa, nuts, fruits and other flavors both natural and synthetic and also artificial color where desired.

The ice cream will contain by weight between about 10% and 15% of butterfat and generally between about 12% and 13.5% of butterfat. The total amount of milk solids not fat will amount to between about 8% and 12% and generally between about 10% and 11.5%.

By using the finely divided special oat fraction of the present invention the finished ice cream will have a highly desirable viscosity both when the ice cream mix is freshly made and also after aging. A distinct advantage of using the finely divided special oat fraction of the present invention is that the viscosity will not be so high as to retard cooling after homogenizing as is observed by the use of other stabilizers such as sodium alginate.

In one experiment where a formula of 13% butterfat, 11% milk solids not fat and 15% of sugar was used to produce ice cream the score of the ice cream made with 0.5% of the finely divided special oat fraction of the present invention was even higher than where 0.5% of a 160 to 175 Bloom gelatin was used, the score expressing the desirability of the ice cream after holding in a dealers' cabinet for six weeks and wherein ice and lactose crystal formation, viscosity, body and texture and "chewing" characteristics were taken into consideration.

Other methods for adding the finely divided special oat fraction of the present invention to the ice cream mix may also be employed. For example, the finely divided special oat fraction may be added to milk or water on the basis of using one pound of the finely divided special oat fraction to about 2 quarts to 4 quarts of the water or milk followed by thoroughly dispersing the finely divided special oat fraction in the water or milk and heating to between about 180° F. and 210° F. This combination may then be added to the ice cream mix before pasteurizing and homogenizing.

It is also possible to add the finely divided special oat fraction after pasteurizing and after homogenizing such as by adding it directly to the freezer and while the ice cream ingredients are being frozen. This is however a much less desirable procedure.

A combination may also be prepared comprising about 1 part of the finely divided special oat fraction and 1 to 4 parts of a sugar and 2 to 5 parts of water, milk or skim milk followed by heating the combination to over about 180° F. and then adding this mixture to the ice cream mix ingredients.

For example, the finely divided special oat fraction may be added in a small amount of less than about 10% by weight to a sugar solution preferably containing more than about 25% total sugar, whether the sugar be sucrose, dextrose, corn syrup or similar sugar, followed by heating to an elevated temperature in excess of 180° F. and desirably to temperatures of between 205° F. and 225° F.

For example, 1 to 5 parts of the finely divided special oat fraction may be added to a sugar solution comprising between 25% and 65% of a sugar and between 35% and 75% of water followed by heating to an elevated temperature of over about 180° F. Under these conditions a highly plastic mass and composition of unusual plasticity and viscosity is obtained. This combination may then be added to the ice cream mix, compensating for the sugar in the plastic mass and so that the amount of the finely divided special oat fraction added will be within the range of the percentages provided for in the present application. Under these conditions improved stabilization and higher viscosity characteristics are obtained.

The finely divided special oat fraction which desirably has been finely divided to about 60 mesh may also be added to the fruits at the time they are frozen such addition being made in the small amount of less than 2% or the finely divided special oat fraction may be added to cream before the cream is frozen, or to any other one of the ice cream ingredients so that when the fruit or the frozen cream or the ice cream ingredient containing the finely divided special oat fraction is incorporated in the ice cream mix, the ice cream mix will contain as an ingredient and stabilizer the small amount of the finely divided special oat fraction herein described.

In addition to adding the finely divided special oat fraction to an ice cream mix as an ingredient and stabilizer, the finely divided special oat fraction may also be used for addition in a similar manner to ice milk which is subject to the same problems and is processed in the same manner as ice cream. Ice milk will normally contain the same approximate content of milk solids not fat, namely, between about 8% and 15% by weight but the butterfat content will be much less than the butterfat content of ice cream and will approximate between about 4% and 6.5% of butterfat.

Since both ice cream and ice milk carry some butterfat content and since they both contain relatively large amounts of milk solids not fat as indicated above they are both subject to ice and lactose crystal formation and to problems of obtaining desirable viscosity, body and texture and proper physical characteristics when held in the dealers' cabinets over normal periods of time.

The finely divided special oat fraction of the present invention is used in ice milk in the same amount indicated for ice cream and will give similar desirable physical characteristics to the ice milk.

By the term "mix ingredients" as used in the present application there is included the usual ingredients employed in the manufacture of ice cream and ice milk such as cream, milk, butter, condensed milk products, powdered milk products, sugars, water, flavoring, fruits, etc.

The fat may also be extracted from the finely divided special oat fraction of the present invention such as by treatment of the special oat fraction or of the finely divided special oat fraction with a fat solvent. Among the fat solvents that are desirably used are included the volatile hydrocarbon solvents such as benzine, hexane, N-pentane, etc., as well as acetone which has been found highly satisfactory. There may also be very desirably used the low molecular weight aliphatic alcohols, particularly isopropyl alcohol but including also methanol, ethanol or propanol.

Among the other solvents that may be employed are carbon tetrachloride, carbon disulphide, dichlorethylene, trichlorethylene, dichlorethylether or similar fat solvents or combinations of any of the above may also be employed. Other fat soluble solvents may also be utilized and it is desirable for a maximum amount of the fat to be removed as would be done in any normal commercial procedure.

It is considered preferable to extract the special coarse oat fraction prepared in the manner indicated above although the coarser particles may first be ground before subjecting to fat extraction. The extracted product is very readily pulverized to the desired point of at least about 75 mesh and desirably to about 90 mesh.

There may also where desired be incorporated along with the finely divided special oat fraction or the fat extracted finely divided special oat fraction in order to give the ice cream or ice milk composition highly desirable and enhanced physical characteristics, minor amounts of mono-glycerides or di-glycerides or minor amounts of polyhydric alcohols in which at least one of the hydroxyl groups is free and in which at least one of the hydroxyl groups is replaced by a fatty acid radical or minor amounts of polyhydric alcohol esters. For example, the special oat fraction may be combined with a mono- or di-glyceride or with such polyhydric alcohol esters as glyceryl-mono-oleate, glyceryl-monostearate, glyceryldistearate, diethylene glycol (mono or di) stearate, diethylene glycol (mono) oleate or any similar ester of a polyhydric alcohol having at least one free hydroxyl group.

These combinations are extremely valuable where it is desired to increase materially the over-run or to hasten the over-run but at the same time to retain good viscosity and body in the ice cream or ice milk mix.

The above polyhydric alcohol esters may be mixed mechanically with the special oat fraction but preferably a paste or aqueous dispersion is prepared in which the special oat fraction is dispersed in water such as in from 5 to 15 parts of water for each 1 part of the finely divided special oat fraction followed by adding thereto the polyhydric alcohol ester of similar composition, which combination is then placed through a colloid mill or homogenizer to thoroughly disperse the polyhydric alcohol ester therethrough followed preferably by drying as on a drum drier or by tray drying or by similar dehydration to produce a composite mass in which the polyhydric alcohol ester is thoroughly dispersed in and through the special oat fraction.

Where as normally these polyhydric alcohol esters "oil off" or come to the surface when added to any ice cream composition and thereby present a major difficulty when trying to obtain a uniform dispersion of the esters through the ice cream composition, where the polyhydric alcohol ester is first combined with the special oat fraction of the present invention an unusual colloid appears to be formed whereby the polyhydric alcohol ester is uniformly dispersed throughout the ice cream composition and remains dispersed therethrough without the oily composition coming to the surface and without "oiling off."

It has furthermore been found that a synergistic effect is obtained on combining the polyhydric alcohol esters with the special oat fraction of the present invention whereby the relative efficiency of the polyhydric alcohol ester is materially increased when combined with the special oat fraction of the present invention over that obtained where the polyhydric alcohol ester is combined with gelatin or similar stabilizer.

Where desired, the special oat fraction may first be dispersed in water such as when using 1 part of the special oat fraction to between 4 and 10 parts of water followed by allowing the combination to stand for a short period of time such as up to about several hours and then followed by drying and pulverizing whereby the full stabilizing effect of the special oat fraction will have been developed and where no further time period will be required to develop the maximum stabilizing activity. During the time that the special oat fraction is allowed to stand in water an elevated temperature may be employed such as up to about 175° F.

By the term "total protein" is meant the total amount of protein present in the special oat fraction of the present invention.

By the term "finely divided" as used in connection with the special oat fraction of the present invention and claims is meant the oat fraction which has been subdivided to a state of fineness that will enable it to go through at least about a 50 mesh screen.

The present application is a continuation in part of applications Serial No. 463,651 filed October 28, 1942, entitled Ice cream compositions, Serial No. 510,831 filed November 17, 1943, entitled Food composition, and Serial No. 401,967 filed July 11, 1941, entitled Water thickening agent.

Having described my invention, what I claim is:

1. A composition selected from the group consisting of ice cream and ice milk, said composition comprising as an ingredient a small amount of a finely divided, dry milled oat product, said oat product containing in excess of about 20% total protein and said oat product having a relatively low starch and a relatively high protein content as compared to dehulled oats.

2. An ice cream composition comprising as an ingredient a small amount of less than 1% of a dry milled oat product having a fineness of at least about 60 mesh, said oat product containing in excess of about 20% total protein and said oat product having a relatively low starch and a relatively high protein content as compared to dehulled oats.

3. A composition selected from the group consisting of ice cream and ice milk, said composition comprising as an ingredient about 0.5% by weight of the coarse fraction of dehulled oats, said fraction having a fineness of at least about 60 mesh, said fraction containing in excess of about 22% total protein, said fraction being free of those particles which will go through a 60 mesh screen when the dehulled oats are pulverized to a fineness that will permit about 80% to 90% thereof to pass through a 60 mesh screen.

4. An ice cream composition comprising as an ingredient a small amount of less than 1% of the finely divided coarse fraction of dehulled oats, said fraction containing in excess of about 22% total protein, said fraction being free of those particles which will go through a 60 mesh screen when the dehulled oats are pulverized to a fineness that will permit about 80% to 90% thereof to pass through a 60 mesh screen.

5. An ice cream comprising as an ingredient a small amount of the finely divided coarse fraction of dehulled oats, said finely divided coarse fraction being substantially free of those particles which will go through a 60 mesh screen when the dehulled oats are pulverized to a fineness that will permit a major proportion thereof to pass through a 60 mesh screen.

6. An ice cream comprising as an ingredient a small amount of less than 1% of the finely divided coarse fraction of dehulled oats, said finely divided coarse fraction being substantially free of those particles which will go through a 60 mesh screen when the dehulled oats are pulverized to a fineness that will permit about 80% to 90% thereof to pass through a 60 mesh screen.

7. A method of producing a composition selected from the group consisting of ice cream and ice milk, which comprises adding as an ingredient to the mix ingredients of a product selected from the group consisting of ice cream and ice milk and thoroughly distributing therethrough a small amount of the finely divided coarse fraction of dehulled oats, said finely divided coarse fraction being substantially free of those particles which will go through a 60 mesh screen when the dehulled oats are pulverized to a fineness that will permit a major proportion thereof to pass through a 60 mesh screen, and then pasteurizing and freezing the composition.

8. A method of producing an ice cream composition which comprises adding as an ingredient to an ice cream mix and thoroughly distributing therethrough a small amount of less than 1% of the finely divided coarse fraction of dehulled oats, said finely divided coarse fraction being substantially free of those particles which will go through a 60 mesh screen when the dehulled oats are pulverized to a fineness that will permit about 80% to 90% thereof to pass through a 60 mesh screen, said finely divided coarse fraction containing in excess of about 20% total protein, and then pasteurizing the ice cream mix.

9. A method of producing an ice cream composition which comprises adding as an ingredient to an ice cream mix and thoroughly distributing therethrough a small amount of less than 1% of the finely divided coarse fraction of dehulled oats, said finely divided coarse fraction being substantially free of those particles which will go through a 60 mesh screen when the dehulled oats are pulverized to a fineness that will permit about 80% to 90% thereof to pass through a 60 mesh screen, said finely divided coarse fraction containing in excess of about 20% total protein, and then pasteurizing the ice cream mix at a temperature of at least about 160° F. for about 30 minutes.

10. A method of producing an ice cream which comprises adding as an ingredient to an ice cream mix and thoroughly distributing therethrough a small amount of less than 1% of a dry milled oat product having a fineness of at least about 60 mesh, said oat product containing in excess of about 20% total protein and said oat product having a relatively low starch and a relatively high protein content as compared to dehulled oats, and then pasteurizing and freezing the ice cream mix.

SIDNEY MUSHER.